US012388753B2

(12) United States Patent
Amasaka et al.

(10) Patent No.: US 12,388,753 B2
(45) Date of Patent: Aug. 12, 2025

(54) CONTROL DEVICE, CONTROL METHOD, AND NON-TRANSITORY RECORDING MEDIUM FOR STORING INSTRUCTION FOR TRANSMITTING REQUESTS

(71) Applicant: NIPPON TELEGRAPH AND TELEPHONE CORPORATION, Tokyo (JP)

(72) Inventors: Mitsuo Amasaka, Tokyo (JP); Hideo Tsuchiya, Tokyo (JP); Takayuki Nakamura, Tokyo (JP); Takuya Sato, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 149 days.

(21) Appl. No.: 18/023,056

(22) PCT Filed: Aug. 27, 2020

(86) PCT No.: PCT/JP2020/032487
§ 371 (c)(1),
(2) Date: Feb. 24, 2023

(87) PCT Pub. No.: WO2022/044235
PCT Pub. Date: Mar. 3, 2022

(65) Prior Publication Data
US 2023/0327993 A1    Oct. 12, 2023

(51) Int. Cl.
*H04L 47/122* (2022.01)
*H04L 43/16* (2022.01)

(52) U.S. Cl.
CPC ............ *H04L 47/122* (2013.01); *H04L 43/16* (2013.01)

(58) Field of Classification Search
CPC .... H04L 47/122; H04L 43/16; H04L 43/0876
See application file for complete search history.

(56) References Cited

U.S. PATENT DOCUMENTS

| 7,809,848 B1 * | 10/2010 | McDougall | ........... | H04L 69/326 |
| | | | | 709/230 |
| 2006/0059258 A1 * | 3/2006 | Black | ...................... | H04L 43/00 |
| | | | | 709/224 |

(Continued)

FOREIGN PATENT DOCUMENTS

WO    WO-2021224931 A1 * 11/2021

OTHER PUBLICATIONS

Nakamura et al. (2020) "A Proposal of Effective D-Plane Configuration Method for End-to-End Network Slicing" General Conference of the Institute of Electronics, Information and Communication Engineers, Mar. 3, 2020.

*Primary Examiner* — Johnny B Aguiar

(57) ABSTRACT

A control device includes a control unit configured to transmit a request received from an information processing device performing setting on a relay device relaying a packet in software defined networking (SDN) to the relay device. The control unit sequentially transmits each request from the information processing device to the relay device and sequentially transmits each response from the relay device in response to each of the requests to the information processing device when a processing load of the control device is equal to or less than a threshold, and transmits a request in which a plurality of requests from the information processing device are collected to the relay device and transmits a response in which responses to the plurality of requests are collected to the information processing device when the processing load of the control device is not equal to or less than the threshold.

4 Claims, 8 Drawing Sheets

(56) References Cited

U.S. PATENT DOCUMENTS

| | | | |
|---|---|---|---|
| 2009/0077233 A1* | 3/2009 | Kurebayashi | H04L 67/60 |
| | | | 709/224 |
| 2016/0226782 A1* | 8/2016 | Schneider | H04L 47/28 |
| 2020/0077303 A1* | 3/2020 | Krishan | H04L 47/22 |
| 2020/0195653 A1* | 6/2020 | Esbensen | H04L 65/611 |

* cited by examiner

CONTROL DEVICE, CONTROL METHOD, AND NON-TRANSITORY RECORDING MEDIUM FOR STORING INSTRUCTION FOR TRANSMITTING REQUESTS

CROSS-REFERENCE TO RELATED APPLICATIONS

This application is a U.S. National Stage Application filed under 35 U.S.C. § 371 claiming priority to International Patent Application No. PCT/JP2020/032487, filed on 27 Aug. 2020, the disclosure of which is hereby incorporated herein by reference in its entirety.

TECHNICAL FIELD

The present invention relates to a control device, a control method, a program, and a communication system.

BACKGROUND ART

In recent years, discussion on introduction of software defined networking (SDN) technology capable of flexibly setting and managing network resources has progressed. In SDN, control and data transmission are separated to unify the control, and thus equipment costs and operation costs can be reduced. As a method for efficiently constructing and controlling an end-to-end network, a slice control method using a dedicated header has been proposed (for example, see NPL 1).

In the technology disclosed in NPL 1, a controller corresponding to an edge slice gateway (SLG) performs control in conjunction with addition, change and deletion of user equipment (UE).

CITATION LIST

Non Patent Literature

[NPL 1] Nakamura et al., A Proposal of Effective D-Plane Configuration Method for End-to-End Network Slicing" IEICE General Conference 2020, B-6-52, March 2020

SUMMARY OF INVENTION

Technical Problem

In the technology disclosed in NPL 1, since a controller corresponding to an edge SLG performs control in conjunction with addition, change, and deletion of UE, when many UEs are connected and setting of the UEs is changed, loads are concentrated on the controller. In this case, there is a possibility of a functional failure such as omission of order processing occurring.

An objective of the present disclosure is to provide a technology capable of appropriately performing processing even when a load on a controller increases.

Solution to Problem

According to the disclosed technology,
a control device includes
a control unit configured to transmit a request received from an information processing device performing setting on a relay device relaying a packet in software defined networking (SDN) to the relay device.

The control unit
sequentially transmits each request from the information processing device to the relay device and sequentially transmits each response from the relay device in response to each of the requests to the information processing device when a processing load of the control device is equal to or less than a threshold, and
transmits a request in which a plurality of requests from the information processing device are collected to the relay device and transmits a response in which responses to the plurality of requests are collected to the information processing device when the processing load of the control device is not equal to or less than the threshold.

Advantageous Effects of Invention

According to the disclosed technology, it is possible to appropriately perform processing even when a load on a controller increases.

DESCRIPTION OF EMBODIMENTS

Hereinafter, an embodiment of the present disclosure (the present embodiment) will be described with reference to the drawings. Embodiments to be described below are merely exemplary, and the embodiments to which the present invention is applied are not limited to the following embodiments.

<System Configuration>

Figure 1:
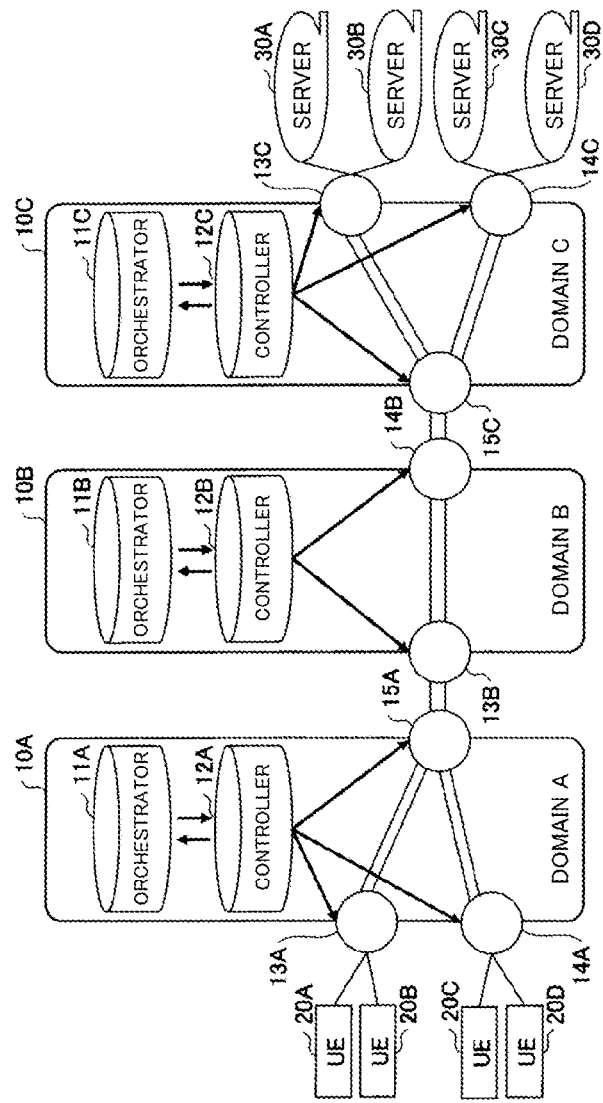
FIG. 1 is a diagram illustrating an example of a configuration of a communication system 1 according to an embodiment.

An example of a configuration of a communication system 1 according to the present embodiment will be described with reference to FIG. 1. FIG. 1 is a diagram illustrating an example of the configuration of the communication system 1 according to the embodiment.

In the example of FIG. 1, the communication system 1 includes a communication network 10A of a domain A, a communication network 10B of a domain B, and a communication network 10C of a domain C (hereinafter simply referred to as the "communication network 10" when it is not necessary to distinguish them from each other).

The communication system 1 includes user equipment (UE) 20A, UE 20B, UE 20C, and UE 20D (hereinafter simply referred to as the "UE 20" when it is not necessary to distinguish them from each other). The communication system 1 includes a server 30A, a server 30B, a server 30C, and a server 30D (hereinafter simply referred to as the "server 30" when it is not necessary to distinguish them from each other). The numbers of the communication networks 10, UE 20, and servers 30 are not limited to the examples of FIG. 1.

The UE 20 communicates with the server 30 via the communication network 10. The UE 20 is a terminal which is used by a user. The UE 20 may be, for example, a personal computer, a smartphone, a tablet terminal, or the like. The server 30 is an information processing device that provides various services to the UE 20.

The communication network 10 is a network to which a software defined networking (SDN) technology is applied. In the example of FIG. 1, the communication network 10A of the domain A includes an orchestrator 11A, a controller 12A, an edge SLG 13A, an edge SLG 14A and an intermediate SLG 15A. The communication network 10B of the domain B includes an orchestrator 11B, a controller 12B, an intermediate SLG 13B, and an intermediate SLG 14B. The communication network 10C of the domain C includes an orchestrator 11C, a controller 12C, an intermediate SLG 15C, an edge SLG 13C, and an edge SLG 14C.

Hereinafter, each SLG is simply referred to as an "SLG 13" when it is not necessary to distinguish the SLGs (13A, 14A, 15A, 13B, 14B, 13C, 14C, and 15C) of the domains A to C from each other. When it is not necessary to distinguish the orchestrators 11A to 11C of the domains A to C from each other, the orchestrators A to C are simply referred to as the "orchestrator 11." When it is not necessary to distinguish the controllers 12A to 12C of the domains A to C, the controllers 12A to 12C are simply referred to as the "controller 12."

The controller 12 is an example of a "control device." The orchestrator 11 is an example of an "information processing device." The SLG 13 is an example of a "relay device."

The orchestrator 11 manages and sets each device of the domain in which the orchestrator 11 is installed. The orchestrator 11 instructs, for example, the controller 12 of the domain to perform various settings on the SLG 13 of the domain.

The controller 12 of each domain receives a request from the orchestrator 11 of the domain and transmits the request to the SLG 13 of the domain. Accordingly, the controller 12 performs various settings on the SLG 13 in accordance with the instruction from the orchestrator 11.

The SLG 13 is a relay device (a gateway, a router, or a switch) for the SDN that determines a transmission destination of a packet (data) transmitted from the device for each device such as each UE 20 in conformity content (rules) set in the controller 12, and transmits (relays or transfers) the packet to the determined transmission destination.

The edge SLG 13A and the edge SLG 14A are requested to perform predetermined setting (flow) by the controller 12A in response to an instruction from the orchestrator 11A when the UE 20A is added, changed, or deleted as a UE to be accommodated. Then, for example, when a packet transferred from the UE 20A is received, the edge SLG 13A may add a slice identifier (ID) to the packet based on the predetermined setting and 5-tuple of the packet and the transmit the packet to the intermediate SLG. The 5-tuple is, for example, information regarding a source address, a destination address, a protocol, a source port, and a destination port in an internet protocol (IP) packet.

In the subsequent intermediate SLG or the like, packets are distributed to tunnels between the SLGs 13 based on the slice ID. The tunnel may be set in advance for each transmission specification such as transmission priority and whether a path is redundant. The packet is transmitted to the server 30 via the tunnels satisfying requirements of a service in which a slice is used.

<Functional Configuration>

Figure 2:
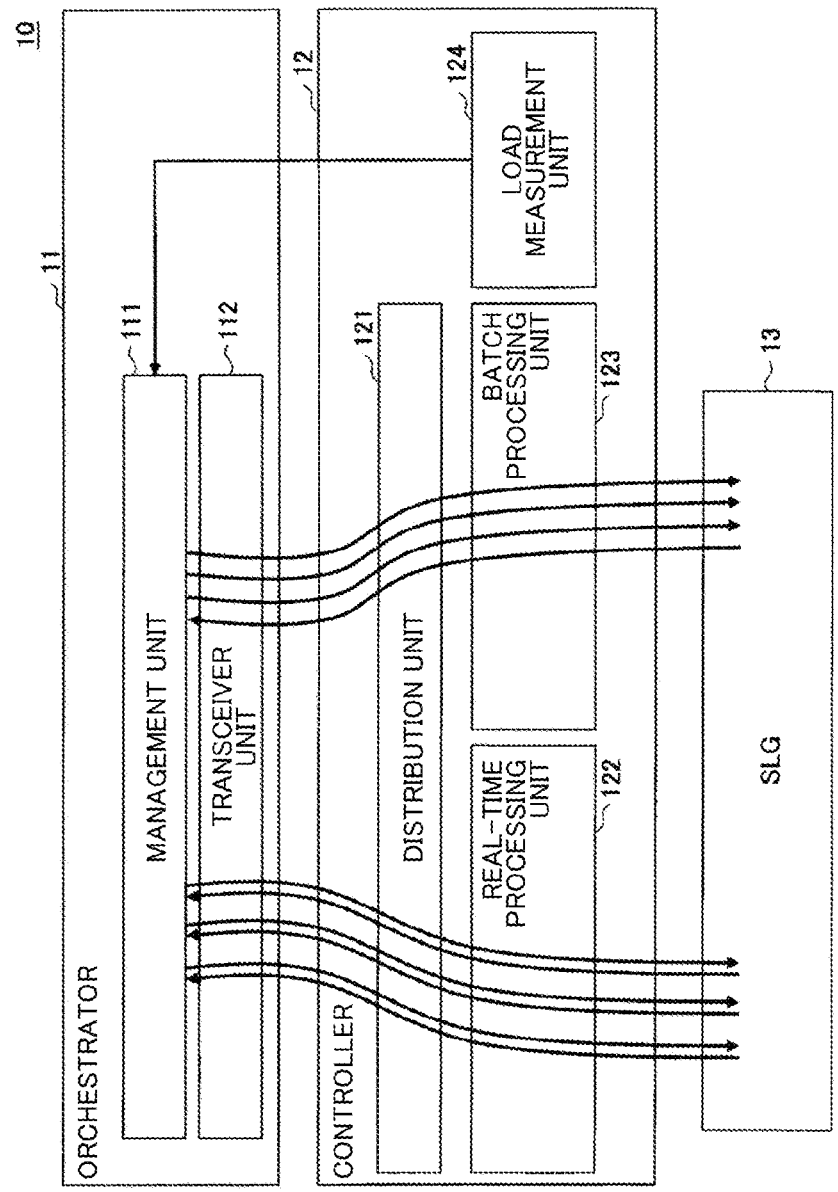
FIG. 2 is a diagram illustrating an example of a functional configuration of an orchestrator 11 and a controller 12 according to the embodiment.

Next, a configuration of the orchestrator 11 and the controller 12 according to the present embodiment will be described with reference to FIG. 2. FIG. 2 is a functional configuration diagram of the orchestrator 11 and the controller 12 according to the present embodiment.

<<Orchestrator 11>>

In the example of FIG. 2, the orchestrator 11 according to the embodiment includes a management unit 111 and a transceiver unit 112. These functional units may be implemented through cooperation between one or more programs installed in the orchestrator 11 and hardware such as a central processing unit (CPU) of the orchestrator 11.

The management unit 111 manages and sets the SLG 13, the UE 20, and the like. For example, the management unit 111 instructs the controller 12 to perform predetermined setting on the specific SLG 13. The transceiver unit 112 communicates with the controller 12.

<<Controller 12>>

In the example of FIG. 2, the controller 12 according to the embodiment includes a distribution unit 121, a real-time processing unit 122, a batch processing unit 123, and a load measurement unit 124. These units may be implemented through cooperation between one or more programs installed in the controller 12 and hardware such as a CPU of the controller 12.

The load measurement unit 124 measures a processing load of the controller 12. A load measurement unit 124 measures a processing load of each SLG 13 controlled by the controller 12.

The distribution unit 121 distributes a request (an instruction or an order) from the orchestrator 11 to one of the real-time processing unit 122 and the batch processing unit 123 in accordance with the load measured by the load measurement unit 124.

The real-time processing unit 122 immediately transmits a request from the orchestrator 11 to the SLG 13 in accordance with an instruction from the distribution unit 121. The real-time processing unit 122 immediately transmits a response from the SLG 13 to the orchestrator 11 in accordance with the instruction of the distribution unit 121.

The batch processing unit 123 transmits a request in which a plurality of requests from the orchestrator 11 are collected to the SLG 13 in accordance with an instruction of the distribution unit 121. The real-time processing unit 122 transmits a response in which responses to each of the plurality of requests from the SLGs 13 are collected as one response to the orchestrator 11 in accordance with the instruction of the distribution unit 121.

<Processing>

Figure 3:
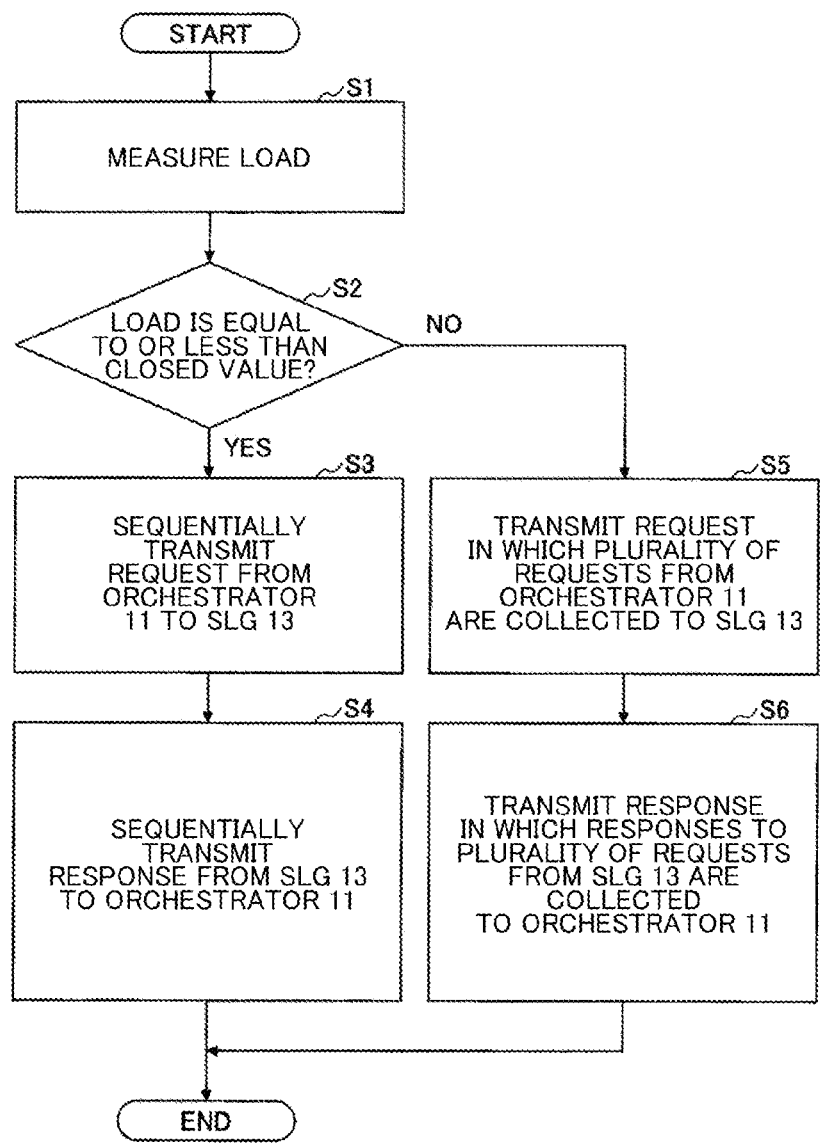
FIG. 3 is a flowchart illustrating an example of processing of the controller 12 according to the embodiment.
Figure 4:
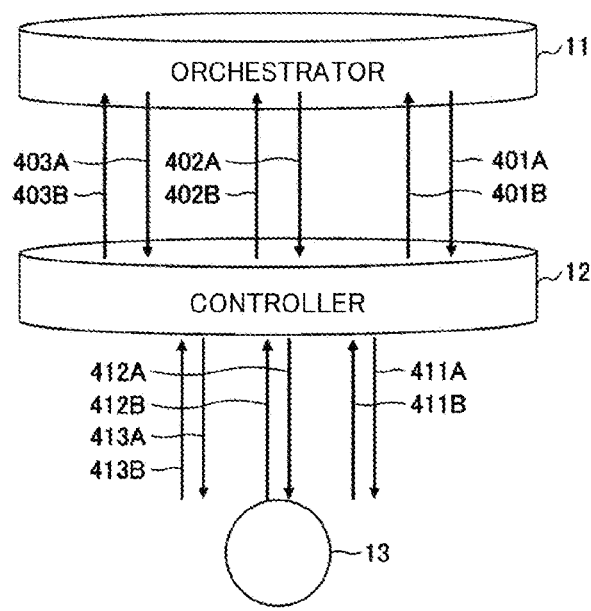
FIG. 4 is a diagram illustrating an example of sequential processing of the controller 12 according to the embodiment.
Figure 5:
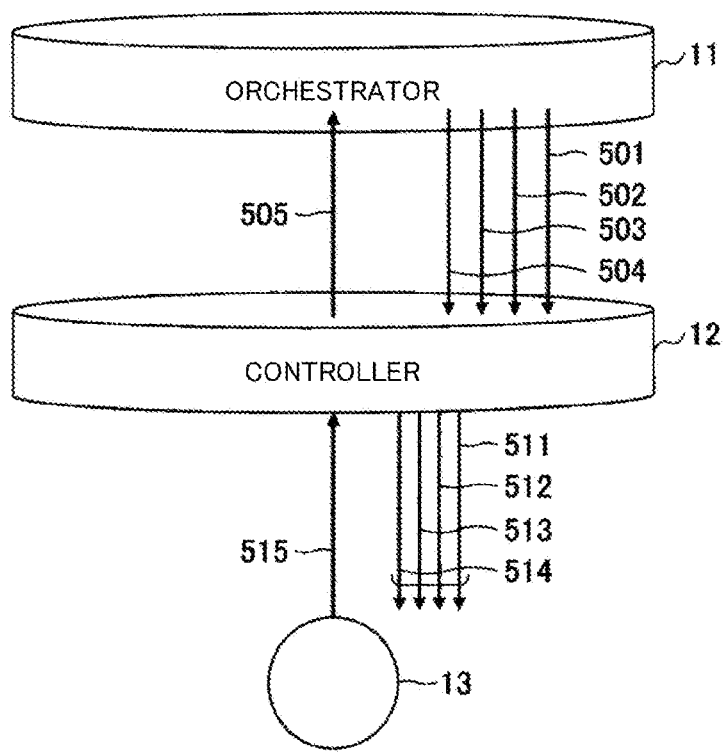
FIG. 5 is a diagram illustrating an example of batch processing of the controller 12 according to the embodiment.
Figure 6:
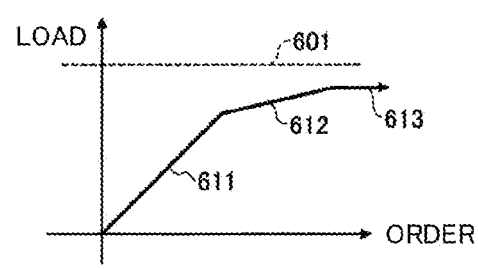
FIG. 6 is a diagram illustrating an example of a reception frequency and a load of a request in the controller 12 according to the embodiment.
Figure 7:
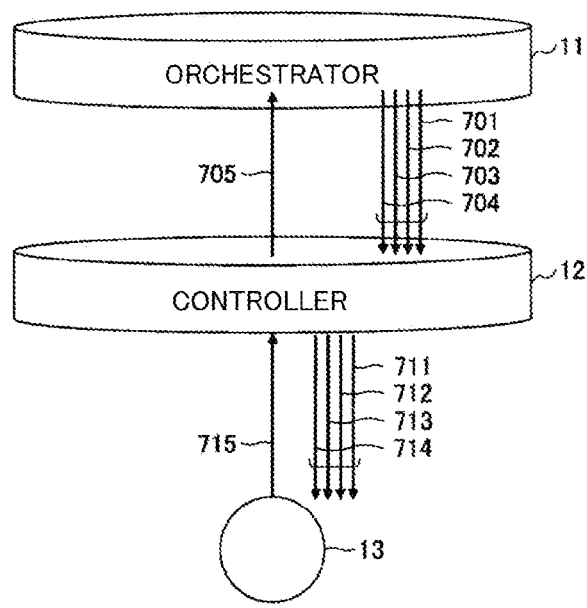
FIG. 7 is a diagram illustrating an example of batch processing of the controller 12 according to the embodiment.

An example of processing of the controller 12 according to the present embodiment will be described with reference to FIGS. 3 to 7. FIG. 3 is a flowchart illustrating an example of processing of the controller 12 according to the embodiment. FIG. 4 is a diagram illustrating an example of sequential processing of the controller 12 according to the embodiment. FIG. 5 is a diagram illustrating an example of batch processing of the controller 12 according to the embodiment. FIG. 6 is a diagram illustrating an example of a reception frequency and a load of a request in the controller 12 according to the embodiment. FIG. 7 is a diagram illustrating an example of batch processing of the controller 12 according to the embodiment.

The following processing may be performed, for example, when the controller 12 of a certain domain receives a request from the orchestrator 11 of that domain.

In step S1, the measurement unit 124 measures a load of the controller 12. Here, the load measurement unit 124 may measure, for example, use rates or the like of the CPU and the memory of the controller 12. The load measurement unit 124 may measure, for example, a frequency at which a request from the orchestrator 11 is transmitted to a specific SLG 13. Subsequently, the load measurement unit 124 of the controller 12 determines whether a load (processing load) of the controller 12 is equal to or less than a threshold (step S2).

(Sequential Processing)

When the load of the controller 12 is equal to or less than a threshold (YES in step S2), the distribution unit 121 sequentially transmits (sequentially processes) each request from an orchestrator 11 to each SLG 13 through the real-time processing unit 122 (step S3). Here, when one request destined for the SLG 13 is received from the orchestrator 11, the distribution unit 121 immediately transmits the one request to the SLG 13.

Subsequently, the distribution unit 121 sequentially transmits each response to each request to the orchestrator 11 through the real-time processing unit 122 (step S4) and ends the processing for the request received from the orchestrator 11. When one response destined for the orchestrator 11 is received from the SLG 13 in the processing of step S4, the distribution unit 121 immediately transmits the one response to the orchestrator 11. Through the processing of steps S3 and S4, setting content instructed by the orchestrator 11 is reflected in the SLG 13 without delay.

In the example of FIG. 4, when the controller 12 receives a request 401A transferred from the orchestrator 11, the controller 12 transmits the request 401A as a request 411A to the SLG 13 through the processing of step S3. When a response 411B is received from the SLG 13, the response 411B is transmitted as a response 401B to the orchestrator 11 through the processing of step S4.

Similarly, when the controller 12 receives a request 402A transmitted from the orchestrator 11, the controller 12 transmits the request 402A as a request 412A to the SLG 13 through the processing of step S3. When a response 412B is received from the SLG 13, the response 412B is transmitted as a response 402B to the orchestrator 11 through the processing of step S4.

Similarly, when the controller 12 receives a request 403A transferred from the orchestrator 11, the controller 12 transmits the request 403A as a request 413A to the SLG 13 through the processing of step S3. When a response 413B is received from the SLG 13, the response 413B is transmitted to the orchestrator 11 as a response 403B through the processing of step S4.

(Batch Processing)

Conversely, when the load of the controller 12 is not equal to or less than the threshold (exceeds the threshold) (NO in step S2), the distribution unit 121 transmits one request including the content of a plurality of requests from the orchestrator 11 to the SLG 13 through the batch processing unit 123 (batch processing) (step S5).

In the distribution unit 121, for example, when the frequency at which the request is transmitted from the orchestrator 11 to the specific SLG 13 and which is measured by the load measurement unit 124 exceeds the threshold, only the requests destined for the SLG 13 may be collected into one request. Accordingly, for example, it is possible to reduce occurrence of delay in setting processing for the other SLG 13 since the setting for the specific SLG 13 is busy.

(Example in which Plurality of Requests are Collected into One Request in Controller 12)

As illustrated in FIG. 5 to be described below, the distribution unit 121 may receive a plurality of requests from the orchestrator 11 and cause the batch processing unit 123 to generate a request in which a plurality of requests received within a predetermined interval (for example, 1 minute) are collected and transmit the request to the SLG 13.

In this case, the distribution unit 121 may notify the orchestrator 11 that the plurality of requests are collected and processed. The orchestrator 11 may include information regarding a sequence number (serial number) in each request and transfer the request to the controller 12. The distribution unit 121 may generate one request including a plurality of sets of the sequence number and content of the request.

The sequence number (serial number) for each request may be given by the controller 12. In this case, for example, the distribution unit 121 may give the sequence number (the serial number) to each request received from the orchestrator 11 in the order of date and time received by the controller 12 or in the order of date and time transmitted from the orchestrator 11.

The distribution unit 121 may collectively transmit a plurality of requests having at least one of the matched destination and priority of the requests among the plurality of requests from the orchestrator 11 to the SLG 13. In this case, the distribution unit 121 may generate one request in which information regarding the matched portion is deleted (integrated) among information such as the destinations, priority, and the like of the requests included in a plurality of requests from the orchestrator 11 without overlapping. In this case, for example, when information regarding a destination included in a first request matches information regarding a destination included in a second request, the distribution unit 121 may delete the information regarding the destination from the second request and then generate one request including information included in the first request and information included in the second request. Accordingly, for example, it is possible to reduce an amount of data transmitted from the controller 12 to the SLG 13.

For example, the distribution unit 121 may convert destinations of a plurality of requests having parts of the matched destinations of the requests among the plurality of requests from the orchestrator 11 into multicast destinations including the destinations of the plurality of requests and may transmit the converted requests to the SLG 13. Accordingly, for example, it is possible to reduce the number of packets transmitted from the controller 12 to the SLG 13.

(Example in which Plurality of Requests are Collected into One Request in Orchestrator 11)

As illustrated in FIG. 7 to be described below, the distribution unit 121 may collect a plurality of requests into one request in the orchestrator 11. In this case, the distribution unit 121 may notify the orchestrator 11 that a plurality of requests are collected and processed. The orchestrator 11 may generate one request including a plurality of sets of data of the sequence number and the content of the requests and transmit the request to the controller 12.

Subsequently, the distribution unit 121 transmits one response in which responses to the plurality of requests are collected to the orchestrator 11 (step S6) and ends processing on the request received from the orchestrator 11. Here, the distribution unit 121 transmits one response including information indicating a processing result for each of the plurality of requests to the orchestrator 11.

(Example in which Plurality of Responses are Collected into One Request in SLG 13)

As illustrated in FIGS. 5 and 7 to be described below, when a request in which a plurality of requests are collected is received from the controller 12, the SLG 13 may transmit (responses) one response in which responses to the plurality of requests are collected to the controller 12. In this case, the SLG 13 may generate one response including a plurality of sets of data of the sequence number for each request and the content of the response to each request.

(Example in which Plurality of Responses are Collected into One Response in Interface Controller 12)

The distribution unit 121 may receive a response which is each response to each of the plurality of requests and includes a sequence number for each request from the SLG 13 and may cause the batch processing unit 123 to generate a response in which a plurality of responses received within a predetermined interval (for example, 1 minute) are collected into one response and transfer the response to the orchestrator 11. In this case, the distribution unit 121 may generate one response including a plurality of sets of data of the sequence number for each request and the content of a response to each request.

In the example of FIG. 5, the controller 12 temporarily records requests 501 and 504 transmitted from the orchestrator 11 at different time points in the processing of step S5 and collectively transmits requests 511 to 514 to the SLG 13 at one time point. When the controller 12 receives a response 515 in which responses to the requests 511 and 514 are collected into one response from the SLG 13, the response 515 is transmitted as a response 505 to the orchestrator 11 in the processing of step S5.

In the example of FIG. 7, the controller 12 collectively receives requests 701 to 704 from the orchestrator 11 and collectively transmits the requests 701 to 704 as requests 711 to 714 to the SLG 13. When the controller 12 receives a response 715 in which responses to the requests 711 to 714 are collected into one response from the SLG 13, the response 715 is transmitted as a response 705 to the orchestrator 11 in the processing of step S5.

Through the processing described with reference to FIG. 3, as illustrated in FIG. 6, with an increase in a frequency of the request (order) from the orchestrator 11, a load of the controller 12 increases, as indicated by a line segment 611.

When the load of the controller 12 exceeds the first threshold, the processing of steps S5 and S6 is performed. Therefore, since the load of the controller 12 increases, as indicated by a line segment 612, an increase speed is lowered.

When the load of the controller 12 exceeds a second threshold higher than the first threshold, the controller 12 may discard at least some of the requests from the orchestrator 11. Accordingly, the load of the controller 12 increases, as indicated by a line segment 613. Therefore, the increase speed is further lowered, and thus the load of the controller 12 does not exceed an upper limit 601 at which a functional failure such as processing omission of an order occurs.

<Advantageous Effects of Present Invention>

In the technology of the related art, for example, when predetermined setting is instructed (the flow is input) to the edge SLG 13 from the orchestrator 11 to the controller 12 due to addition, change, deletion, and the like of the UE 20, a load is concentrated on the controller 12, and processing omission of an order and a functional failure may occur. For example, it is considered that such a problem occurs in particular when many UEs 20 are added at a time, for example, to enlarge (scale) the SDN network.

According to the above-described embodiment, even when the load on the controller 12 is increased, the processing can be appropriately performed.

(Other Exemplary Configurations)

The function of each functional block in the controller 12 illustrated in FIG. 1 may be implemented by dedicated hardware (a Large-Scale-Integration (LSI) or the like) or by a general-purpose computer including a processor (a CPU, a Digital Signal Processor (DSP), or the like) and a memory and software operating on the computer.

Figure 8:
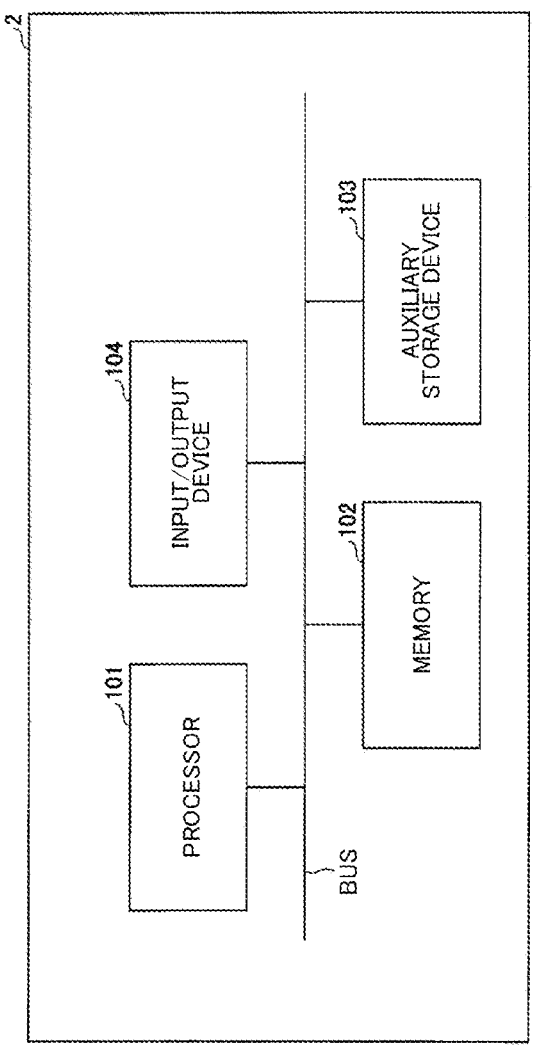
FIG. 8 is a diagram illustrating an example of a configuration of the controller 12 according to the embodiment.

FIG. 8 illustrates an example of a configuration of the controller 12 when the controller 12 is implemented using a computer and software.

As illustrated in FIG. 8, the controller 12 includes a processor 101, a memory 102, an auxiliary storage device 103, and an input/output device 104 which are connected by a bus.

For example, a program implementing processing of the controller 12 is stored in the auxiliary storage device 103 (a computer-readable recording medium). When the controller 12 operates, the program is read to the memory 102 and the processor 101 reads the program from the memory 102 to execute the program. For example, the processor 101 executes processing of the distribution unit 121 or the like in accordance with the program.

The "computer-readable recording medium" is, for example, a portable medium such as a flexible disk, a magneto-optical disc, a Read-Only Memory (ROM), or a Compact Disk Read-Only Memory (CD-ROM), a hard disk built in a computer system, or the like. The "computer-readable recording medium" may also include an element that dynamically retains a program in a short time such as a communication line when the program is transferred over a network such as the Internet or a communication line such as a telephone line, or an element that retains a program for a given time period such as a volatile memory inside a server or a computer system serving as client in that case.

Although the embodiment has been described above, the present invention is not limited to such a specific embodiment, and various modifications and changes can be made within the scope of the gist of the present invention described in the claims.

REFERENCE SIGNS LIST

1 Communication system
10 Communication network
11 Orchestrator
111 Management unit
112 Transceiver unit
12 Controller
121 Distribution unit
122 Real-time processing unit
123 Batch processing unit
124 Load measurement unit
13 SLG
20 UE
30 Server

The invention claimed is:

1. A control device comprising:
a controller configured to:
transmit a collection of individual requests based on respective individual requests received from an information processing device to a relay device, wherein to transmit the collection of individual requests includes to:
    transmit the collection of individual requests in which the respective individual requests of a plurality of individual requests from the information processing device are collected to the relay device and transmit a collection of responses in which respective responses to the plurality of individual requests are collected to the information processing device when a processing load of the control device is not equal to or less than a threshold,
    wherein the collection of individual requests comprises a multicast destination setting based on a plurality of destinations of the collected respective individual requests of the plurality of individual requests, and
    the transmission of the collection of individual requests further comprises collectively transmitting the plurality of individual requests having at least one of a matched destination and priority of an individual request among the plurality of individual requests from the information processing device to the relay device when the processing load of the control device is not equal to or less than the threshold; and
convert destinations of the plurality of individual requests having parts of matched destinations of two or more individual requests of the plurality of individual requests from the information processing device into multicast destinations, and collectively transmit the converted individual requests as at least a part of the collection of individual requests to the relay device when the processing load of the control device is not equal to or less than the threshold.

2. A control method comprising:
performing, by a processor of a first device, transmission processing of an individual request received from a second device to a third device,
wherein, in the transmission processing,
    a collection of individual requests comprising a plurality of individual requests from the second device is collectively transmitted to the third device,
    a collection of responses comprising information indicating a processing result for each of the plurality of individual requests is transmitted to the second device when a processing load of the processor of the first device is not equal to or less than a threshold, and
    the collection of individual requests further comprises a multicast destination setting based on a plurality of destinations of the collected respective individual requests of the plurality of individual requests,
    the plurality of individual requests having at least one of a matched destination and priority of the respective individual request among the plurality of individual requests from the second device are collectively transmitted to the third device as the collection of individual requests when the processing load of the first device is not equal to or less than the threshold,
    destinations of the plurality of individual requests having parts of matched destinations of the collected respective individual requests or the plurality of individual requests from the second device are converted into multicast destinations, and
    the converted individual requests are collectively transmitted to the third device as the collection of individual requests when the processing load of the first device is not equal to or less than the threshold.

3. A computer-readable non-transitory recording medium storing computer-executable program instructions, that when executed by a processor causes a control device to perform:
processing to transmit an individual request received from an information processing device to a relay device,
wherein, in the transmission processing,
    a collection of individual requests comprising a plurality of individual requests from the information processing device is collectively transmitted to the relay device,
    a collection of responses comprising information indicating processing results of respective individual request of the plurality of individual requests is transmitted to the information processing device when a processing load of the control device is not equal to or less than a threshold,
    the collection of individual requests comprises a multicast destination setting based on a plurality of destinations of the collected respective individual requests of the plurality of individual requests,
    the plurality of individual requests having at least one of a matched destination and priority of the respective individual requests among the plurality of individual requests from the information processing device are collectively transmitted to the relay device as the collection of individual requests when the processing load of the control device is not equal to or less than the threshold,
    destinations of the plurality of individual requests having parts of matched destinations of the collected respective individual requests among the plurality of individual requests from the information processing device are converted into multicast destinations, and
    the converted individual requests are collectively transmitted to the relay device as the collection of individual requests when the processing load of the control device is not equal to or less than the threshold.

4. A communication system comprising:
a first device comprising a first processor configured to execute operations comprising transmitting a request received from a second device to a third device,
    wherein the second device comprises a second processor configured to execute operations comprising performing setting on the third device,
    the third device comprising a third processor configured to execute operations comprising relaying a packet in software defined networking (SDN),
    the transmitting the request further comprises:
        collectively transmitting, based on processing load of the first device and a threshold, a collection of individual requests comprising a plurality of individual requests from the second device to the third device, and
        transmitting a collection of responses comprising information indicating respective processing results for the respective individual requests of the plurality of individual requests to the second device,
            wherein the collection of individual requests comprises a multicast destination setting based on a plurality of destinations of the collected respective individual requests of the plurality of individual requests, and
        collectively transmitting the plurality of individual requests having at least one of a matched destination and priority of the request among the plurality of individual requests from the second device to the third device when the processing load of the first device is not equal to or less than the threshold, wherein the first processor is further configured to execute operations comprising converting destinations of the plurality of individual requests having parts of matched destinations of two or more individual requests of the plurality of individual requests from the second device into multicast destinations, and the converted individual requests are collectively transmitted to the third device as the collection of individual requests when the processing load of the first processor of the first device is not equal to or less than the threshold.

\* \* \* \* \*